(12) United States Patent
Burton

(10) Patent No.: US 7,052,164 B2
(45) Date of Patent: May 30, 2006

(54) GEAR SCREW ADJUSTER

(75) Inventor: John Burton, Ludington, MI (US)

(73) Assignee: Burton Technologies LLC, Ludington, MI (US)

( * ) Notice: Subject to any disclaimer, the term of this patent is extended or adjusted under 35 U.S.C. 154(b) by 48 days.

(21) Appl. No.: 10/292,376

(22) Filed: Nov. 12, 2002

(65) Prior Publication Data

US 2004/0090792 A1 May 13, 2004

(51) Int. Cl.
*B60Q 1/00* (2006.01)
*B60Q 1/26* (2006.01)
*B60Q 1/32* (2006.01)
*B60Q 11/00* (2006.01)
*B60Q 3/00* (2006.01)

(52) U.S. Cl. .............. 362/507; 362/514; 362/529; 362/524; 362/656; 362/273; 362/284; 362/324; 362/428; 362/449; 362/460

(58) Field of Classification Search .............. 362/507, 362/512, 514, 524, 529, 226, 273, 282, 284, 362/324, 322, 428, 449, 656
See application file for complete search history.

(56) References Cited

U.S. PATENT DOCUMENTS

| | | | |
|---|---|---|---|
| 4,574,334 A | 3/1986 | Igura | |
| 4,930,367 A | 6/1990 | Nagasawa | |
| 5,003,436 A | 3/1991 | Yamada et al. | |
| 5,032,964 A * | 7/1991 | Endo et al. | 362/462 |
| 5,067,052 A * | 11/1991 | Suzuki et al. | 362/462 |
| 5,214,971 A | 6/1993 | Burton et al. | |
| 5,355,287 A | 10/1994 | Denley | |
| 5,365,415 A | 11/1994 | Schmitt et al. | |
| 5,381,317 A | 1/1995 | Schmitt et al. | |
| 5,444,603 A | 8/1995 | Otsuka et al. | |
| 5,508,896 A | 4/1996 | Suehiro et al. | |
| 5,535,103 A * | 7/1996 | Iiyama et al. | 362/460 |
| 5,546,283 A | 8/1996 | Ohtsuka et al. | |
| 5,697,692 A | 12/1997 | Hoffman et al. | |
| 5,707,133 A | 1/1998 | Burton | |
| 5,707,134 A | 1/1998 | Nishizawa | |
| 5,746,559 A | 5/1998 | Shirai | |
| 5,951,157 A | 9/1999 | Shirai et al. | |
| 6,017,136 A | 1/2000 | Burton | |
| 6,082,882 A * | 7/2000 | Akiyama et al. | 362/524 |
| 6,113,301 A | 9/2000 | Burton | |
| 6,161,950 A | 12/2000 | Tsukamoto et al. | |
| 6,231,223 B1 | 5/2001 | Zucar et al. | |
| 6,244,735 B1 | 6/2001 | Burton | |
| 6,247,868 B1 | 6/2001 | Burton | |
| 6,257,747 B1 | 7/2001 | Burton | |
| 6,260,993 B1 | 7/2001 | Ito | |
| 6,315,439 B1 * | 11/2001 | Denley | 362/524 |
| 6,481,879 B1 | 11/2002 | Shirai et al. | |

(Continued)

FOREIGN PATENT DOCUMENTS

EP   0 759 377 B1   3/2000

*Primary Examiner*—Sandra O'Shea
*Assistant Examiner*—Sharon Payne
(74) *Attorney, Agent, or Firm*—Brian G. Gilpin; Godfrey & Kahn, S.C.

(57) ABSTRACT

A headlamp assembly including a simplified adjusting mechanism for adjusting the aim of the headlamp. The mechanism includes a gear screw that is snap fit into the headlamp housing with or without an adjuster housing. The gear screw has an O-ring in radial compression so as to ensure a good seal.

17 Claims, 14 Drawing Sheets

U.S. PATENT DOCUMENTS 6,481,880 B1  11/2002  Mizuno et al.
6,607,295 B1   8/2003  Hayakawa
6,637,919 B1  10/2003  Shirai
2002/0085385 A1  7/2002  Shirai

* cited by examiner

GEAR SCREW ADJUSTER

BACKGROUND OF THE INVENTION

This invention relates generally to adjusting devices, and in particular to a gear screw adjuster used in connection with motor vehicle headlamps.

As the design of vehicles, automobile, and light trucks in particular, has evolved, headlights have continually been reconfigured to improve the aerodynamics of the front end of the vehicle. Modern headlights are designed so that their lenses follow the contour of the vehicle to provide an aerodynamically efficient exterior surface. However, adjustment of these headlights must still be performed in order to provide an optimal beam of light and to prevent the aiming of light beams toward oncoming vehicles. Automotive manufacturers' demand for aerodynamically efficient headlight designs has lead to modular designs requiring the headlight adjustment mechanism to be located within the interior of the engine compartment so that adjustment can be easily performed without removing any exterior trim pieces. Thus, the constraints of the installation area and the demands of the automobile manufacturers for aerodynamic headlight designs make it desirable to provide an adjuster for use with the aerodynamic designs that is adjustable from inside the engine compartment using ordinary tools, and translates rotational motion of the adjusting part into adjustment of the reflector within the headlight assembly. There are a wide variety of prior art adjuster devices including, among others, the devices disclosed in U.S. Pat. Nos. 5,707,133 and 5,214,971 to Burton, the inventor of the present invention, the disclosures of which are incorporated herein by reference.

As disclosed in FIGS. 17 and 23 of U.S. Pat. No. 6,247,868, the disclosure of which is incorporated herein by reference, automotive lamp assemblies used as headlights typically comprise several basic parts: a support frame, a reflector, a lens, a bulb, and one or more adjusters. The support frame houses the reflector and the bulb on a pivotable mounting to allow the aim of the light to be adjusted using the adjuster. The lens seals the front of the assembly to protect it from the elements assailing the front end of the vehicle and provides an aerodynamic shape and attractive appearance. Traditionally, fixed and moveable ball joints have engaged the headlamp reflector. Actuating the moveable ball joint would result in altering the angle of the headlamp reflector by pivoting the headlamp about the fixed ball joints. In certain variations, two moveable ball joints are used to enable vertical and horizontal aiming of the headlamp.

In some instances, an aiming or gear screw replaces the moveable ball joint. With the screw assembly, the reflector mounts inside the housing on a gear screw assembly and is adjustable horizontally and/or vertically using adjusters that interface with the reflector by moving the gear screw. One such a screw assembly is disclosed in U.S. Pat. No. 5,444,603 to Otsuka et al. In order to securely hold the headlamp in the desired position, additional parts must be added to the aiming screw. As shown in FIG. 10 of the Otsuka Patent, a push-on fixer 10 is added to the aiming screw 20 after the screw 20 is inserted through the headlamp housing 1. Using a push-on fixer requires steps in addition to merely inserting the screw through the headlamp housing.

The Otsuka Patent also discloses the use of an O-ring 9a and plastic washer 96 or wave washer 8 to attempt to effect a seal between the headlamp housing 1 and the flange 24 of the screw 20 to control screw torque, and to control axial screw backlash. Such a configuration places the O-ring and washers in facial compression, the amount of which will very as a result of the individual part tolerances. Such variations in facial compression has been found problematic in that it can cause wide variations in screw torque and can result in inadequate sealing.

Accordingly, the need exists for a compact gear screw adjuster assembly that can be securely retained in a wall or other structure of the headlamp housing, can be adapted for use in connection with various headlamp housing and headlamp reflector designs, is more efficient and cost effective to assemble to the headlamp housing, and reduces the sealing problems associated with facially sealing O-rings. Of course, the present invention may be used in a multitude of non-automotive lamp situations where similar performance capabilities are required.

SUMMARY OF THE INVENTION

The present invention provides a gear screw adjuster assembly that is cost-effective, easily installed in the lamp where it is securely retained, provides an improved seal reduces screw torque variation, and which solves the problems raised or not solved by existing designs. In one embodiment, the gear screw directly snap fits into the headlamp housing. In some embodiments, the gear screw is first inserted into an adjuster housing. Then, the screw and adjuster housing are together snap fit into the headlamp housing. In another embodiment, the gear screw is snap fit into the adjuster housing which engages the headlamp housing in the well-known quarter-turn fashion. After the gear screw, and any accompanying adjuster housing, has engaged the headlamp housing, the reflector of the headlamp assembly is positioned to engage the gear screw. The gear screw is threaded so that rotation of the gear screw translates the reflector into the correct position.

In addition, the gear screw adjuster assembly achieves a substantially improved seal between the headlamp reflector and the headlamp housing while reducing screw torque variation. The present invention achieves a radial compression seal around the O-ring. Such a radial compression seal is accomplished by controlling the diameter of the screw and inner diameter of the housing. The result is less variation in seal compression, reduced screw torque variation, and improved sealing as opposed to the conventional facial seal.

In one embodiment of the present invention, the gear screw assembly can be securely inserted and retained in the headlamp housing without the additional step of adding a push-on fixer to the screw engagement as is required in certain conventional adjusters. Alternatively, the gear screw may be first snap fit into an adjuster housing which is then inserted and engaged in the headlamp housing in the traditional quarter turn fashion or other manner.

While one possible application of the present invention is in headlamp assemblies, many other applications are possible and references to use in a headlamp assembly should not be deemed to limit the uses of the present invention. The terms "housing," gear screw," "threading," or "teeth" as used herein should not be interpreted as being limited to specific forms or shapes of screws, threading thereon, or teeth. Rather, the housing, gear screw, threading, and teeth of the gear screw assembly in accordance with the present invention may have a wide variety of shapes. These and other objects and advantages of the present invention will become apparent from the detailed description, claims, and accompanying drawings.

DETAILED DESCRIPTION OF THE PREFERRED EMBODIMENTS

Figure 1:
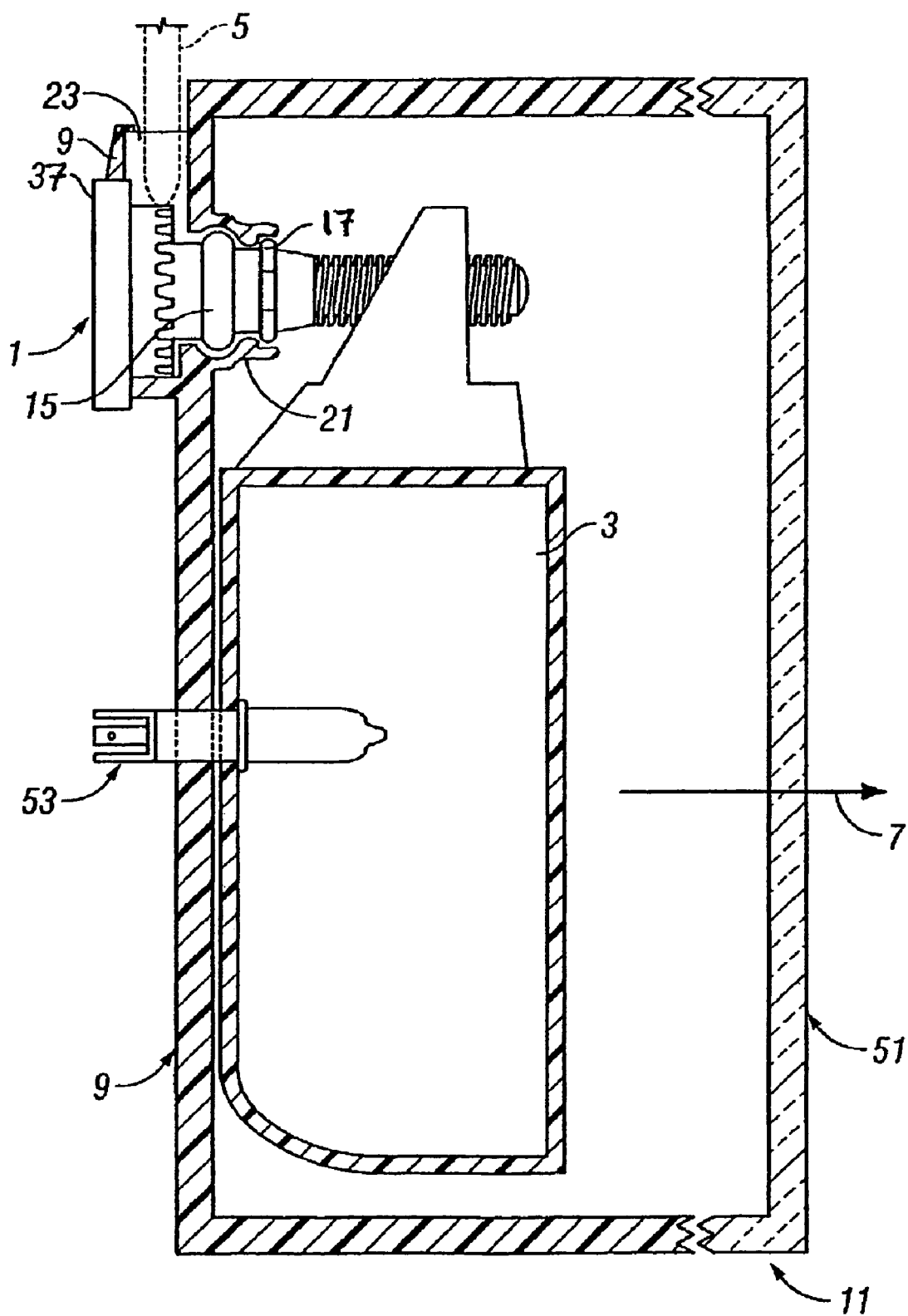
FIG. 1 is a partial cross section of a headlamp assembly with a gear screw adjuster assembly in accordance with one embodiment of the present invention.

Three illustrative embodiments of a gear screw adjuster assembly (identified generally as 1) in accordance with the present invention are shown in FIGS. 1 through 17. While the invention may be susceptible to embodiment in different forms, there is shown in the drawings, and herein will be described in detail, certain illustrative embodiments with the understanding that the present disclosure is to be considered an exemplification of the principles of the invention, and is not intended to limit the invention to those as illustrated and described herein. Additionally, features illustrated and described with respect to one embodiment could be used in connection with other embodiments.

FIG 1 shows a headlamp assembly 11 whereby the desired aiming of the headlamp as indicated by an arrow 7 is achieved by actuating a gear screw adjuster assembly 1. The headlamp assembly 11 comprises many parts, including but not limited to, a housing 9, a moveable reflector 3, a lens 51, and the requisite lamp and wiring 53.

The adjuster mechanism 1 is used to adjust the movable reflector 3. A single adjuster mechanism 1 can be used to adjust the reflector 3 in either the horizontal or the vertical direction, while another similar adjuster mechanism may be used if adjustment in both dierctions is desired.

In one embodiment, the adjuster mechanism 1 is assembled and inserted through a stationary component of the headlamp assembly 11 such as the housing 9 and is engaged with the reflector 3. The adjuster mechanism 1 includes an adjusting or gear screw 13, an O-ring 15, and a retaining clip 17 for securely holding the gear screw 13 in the headlamp housing. The adjuster mechanism 1 is shown in detail in FIG. 4. The gear screw 13 may be made of a plastic material by appropriate manufacturing methods such as molding or casting. Alternatively, the gear screw may be made of metal material by appropriate manufacturing methods.

Figure 3:
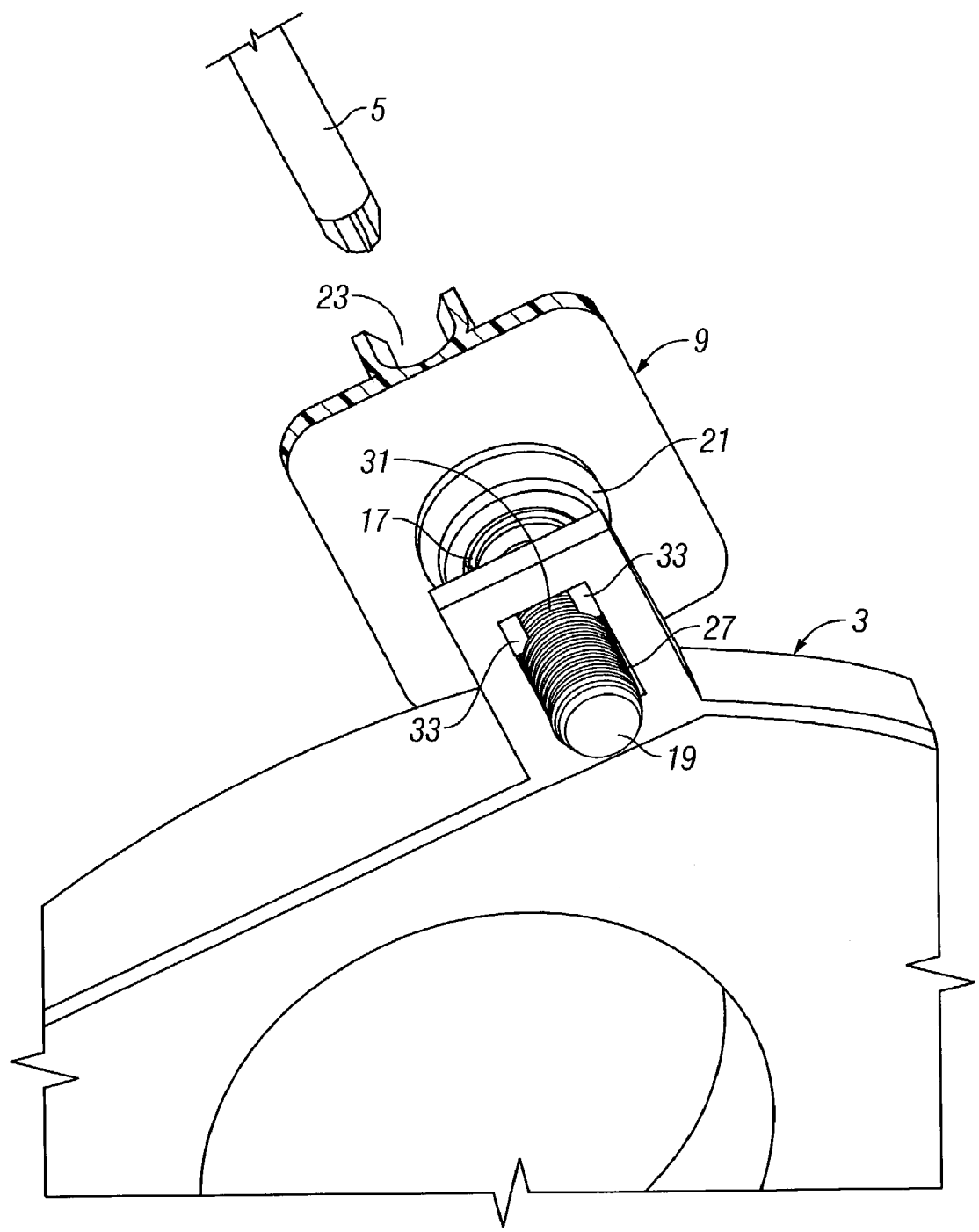
FIG. 3 is a rotated detail perspective view of the gear screw adjuster assembly of FIG. 1.
Figure 5:
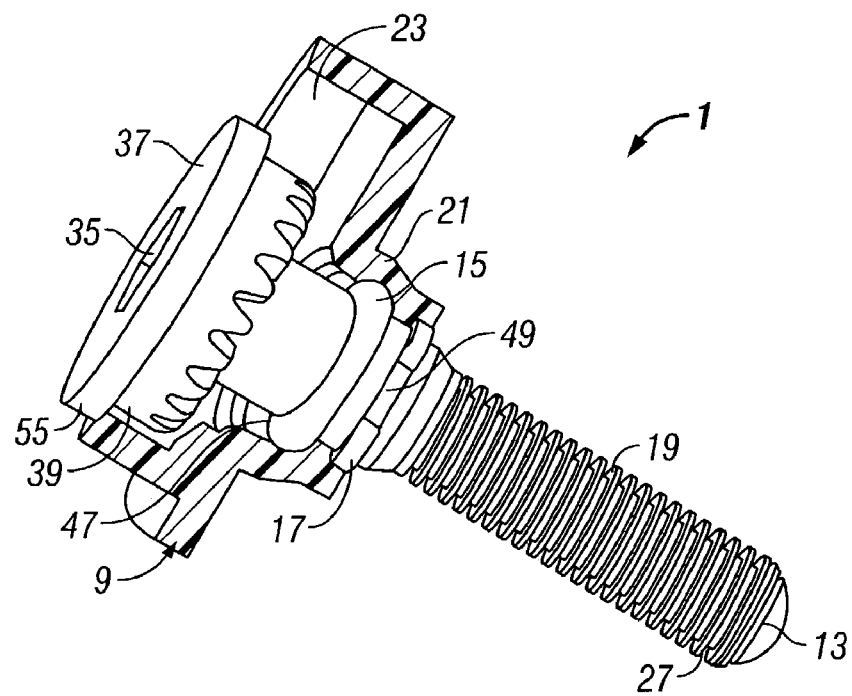
FIG. 5 is a partial cross section of the headlamp assembly with the gear screw adjuster assembly of FIG. 1.

The gear screw 13 also provides for an O-ring 15 to be located along its neck 45. The neck 45 may have an O-ring groove in which the O-ring 15 is located. This configuration maintains the position of the O-ring 15 as the gear screw 13 is snap fit into the housing 9. The O-ring 15 remains in the groove while the screw 13 travels through the housing 9 and while the screw 13 is rotated. As shown in FIGS. 1, 3 and 5, the O-ring 15 functions to create a radial seal in the neck 21 of the housing 9 in which the gear screw 13 is positioned. The reinforced neck 21 has an interior diameter 47 so that the neck 21 exerts a radial force along the outer diameter of the O-ring 15 once the gear screw 13 has been snap-fit and secured in the housing 9. This force creates a radial compression of the O-ring 15. As such, a complete radial seal is created between the neck 21 of the housing 9 and the O-ring 15 and between the neck 45 of the gear screw 13 and the O-ring 15.

Figure 4:
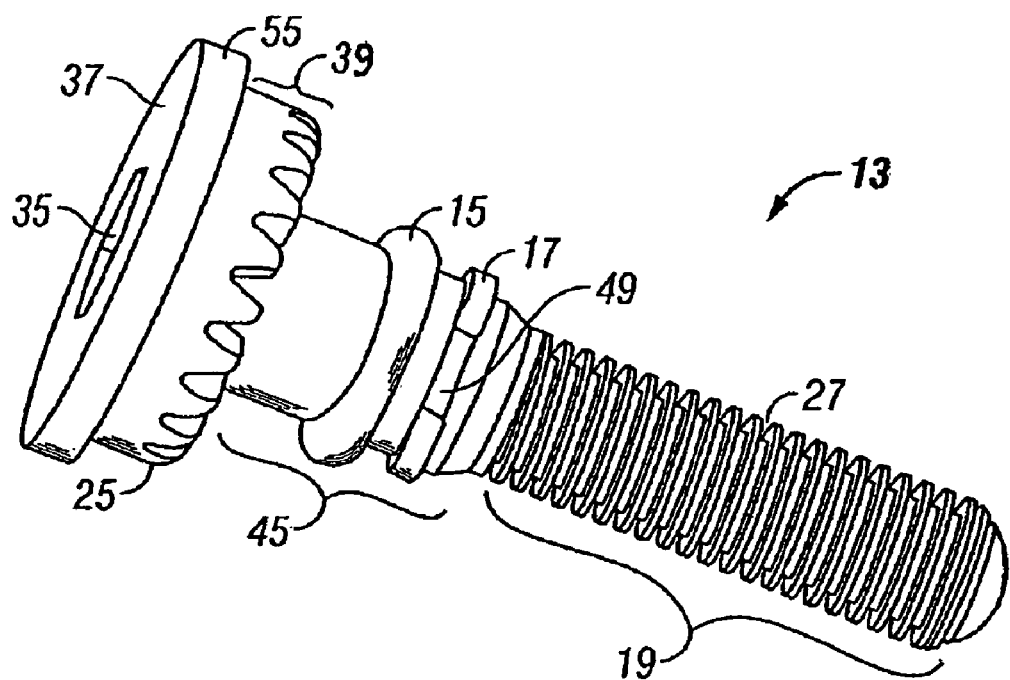
FIG. 4 is a perspective view of one embodiment of a gear screw that can be used in a gear screw adjuster assembly.
Figure 4A:
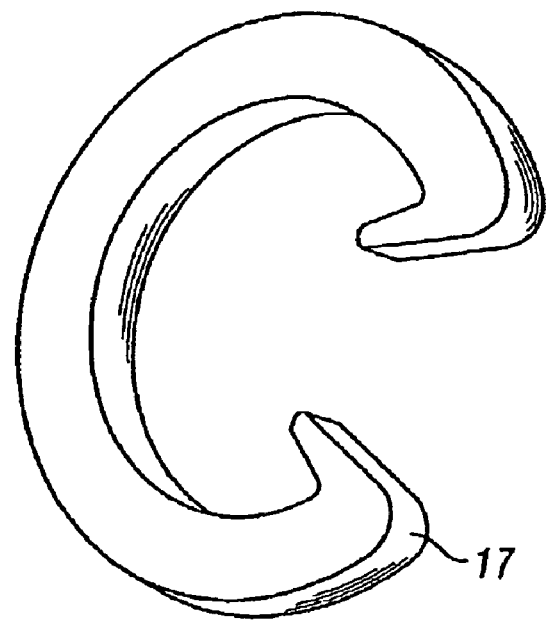
FIG. 4A is a perspective view of one embodiment of the retaining clip.

There are the two methods that have been found effective for securing the gear screw 13 in the reinforced neck 21 but other methods may be used. FIG. 5 shows one such method using a retainging clip 17 on embodiment of which is shown in detail in FIG. 4A. The retaining clip 17, like the O-ring 15, is positioned in a groove 49 located along the neck 45 of the screw 13. As the screw 13 is pushed into the reinforced neck 21, the retaining clip 17 is compressed into the clip groove 49. The interior diameter 47 of the neck 21 is angled so that the clip 17 contacts the interior diameter 47 as the gear screw 13 is inserted into the neck 21. As the gear screw 13 passes through the neck 21, the interior diameter 47 of the neck compresses the retaining clip 17 into the clip groove 49. The interior diameter 47 of the neck 21 provides sufficient space to allow the retaining clip 17 to expand once the gear screw 13 is inserted into the neck 21 in the correct position. As such, the retaining chip 17 "pops" open once the gear screw 13 reaches the correct position. Snap fitting the gear screw 13 into the headlamp housing 9 provides an easy way to ensure the gear screw 13 is properly and securely positioned in the headlamp housing 9. The retaining clip 17 may be made of plastic, metal, or other material.

Figure 14:
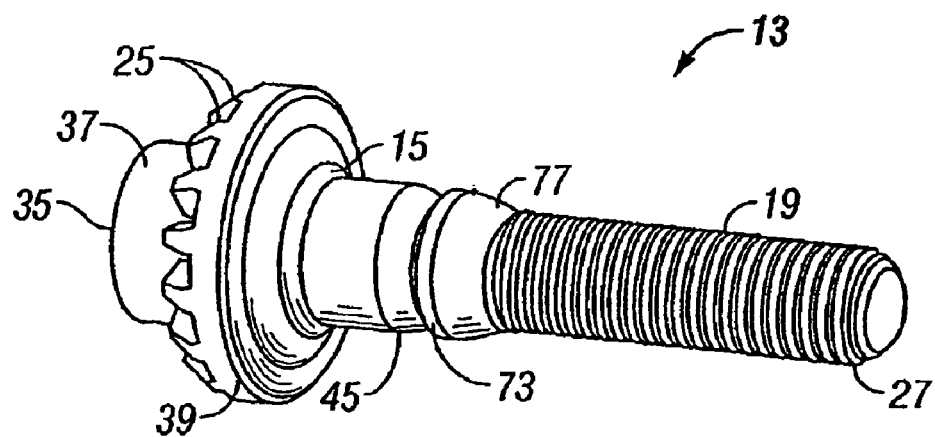
FIG. 14 is a perspective view of one embodiment of a gear screw used in one embodiment of the gear screw adjuster.

One alternative method for the gear screw 13 to securely engage the reinforced neck 21 is illustrated in FIG. 14. This method involves snap fitting the gear screw 13 into the housing 9 whereby the gear screw 13 itself provides the securing method. The diameter 75 of the gear screw 13 increases over an area 77 of the screw shaft 19 between the threads 27 and the neck 45. Immediately after this area 77 is an undercut section 73. The diameter of the undercut section is less than that of the area 77 or the neck 45. The headlamp housing 9 has an orifice (not shown) that will flex to accommodate the increased diameter area 77. The input shaft 19 is inserted into the orifice. As the area 77 travels through and contacts the orifice, the orifice expands to accommodate the increased diameter 75. Once the area 77 passes through the orifice, the orifice diameter decreases as the undercut section 73 is now in contact with the orifice. The reduced diameter of the undercut section 73 as compared to that of the area 77 and the neck 45 maintains the position of the gear screw 13 in the housing 9 by the orifice securely engages the undercut section 73.

Figure 2:
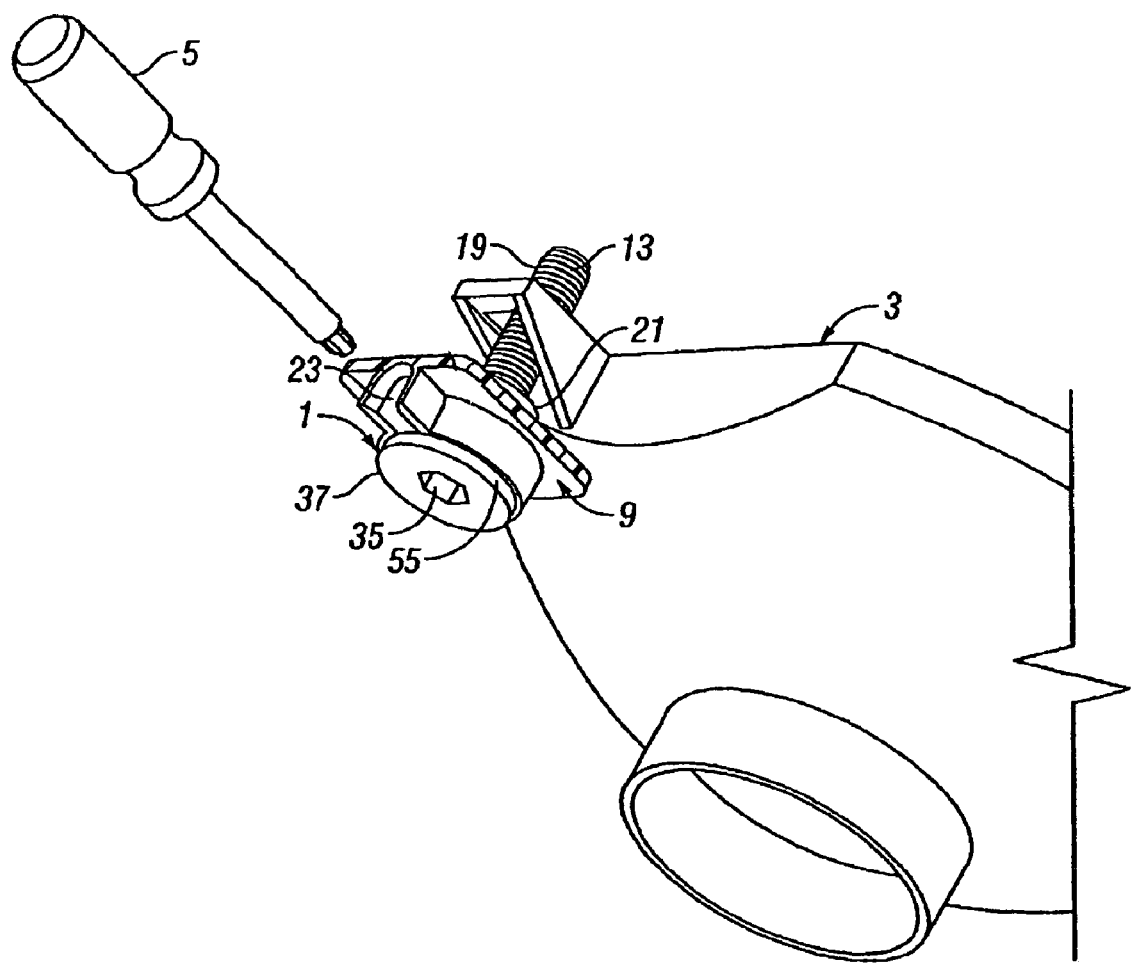
FIG. 2 is a perspective view of the headlamp assembly with a gear screw adjuster assembly of FIG. 1.

The gear adjuster assembly 1 is assembled by pushing the gear screw 13, accompanying O-ring 15, and retaining clip 17 through the interior diameter 47 of neck 21, through the reinforced neck 21 of the housing 9. The completed assembly is shown in FIG. 5. The screw shaft 19 extends through and beyond the reinforced neck 21. The end of the screw shaft 19 is threaded so as to insert into and rotatably engage the reflector 3. This engagement is shown in FIGS. 1–3. Such engagement can occur directly between the threads 27 and the reflector 3 or a nut or grommet, such as the nut disclosed in U.S. Pat. No. 5,746,559 and the grommet shown in FIGS. 7 and 8 can be used. The reflector 3 has a slot 31 that engages the threads 27 as shown in FIG. 3. The slot 31 may be made of a plastic material or made of metal and is preferably molded as part of the reflector 3. Alternatively, the slot 31 may be a separate piece that is attached by molding, bracketing, welding, or the like to the reflector 3.

Figure 7:
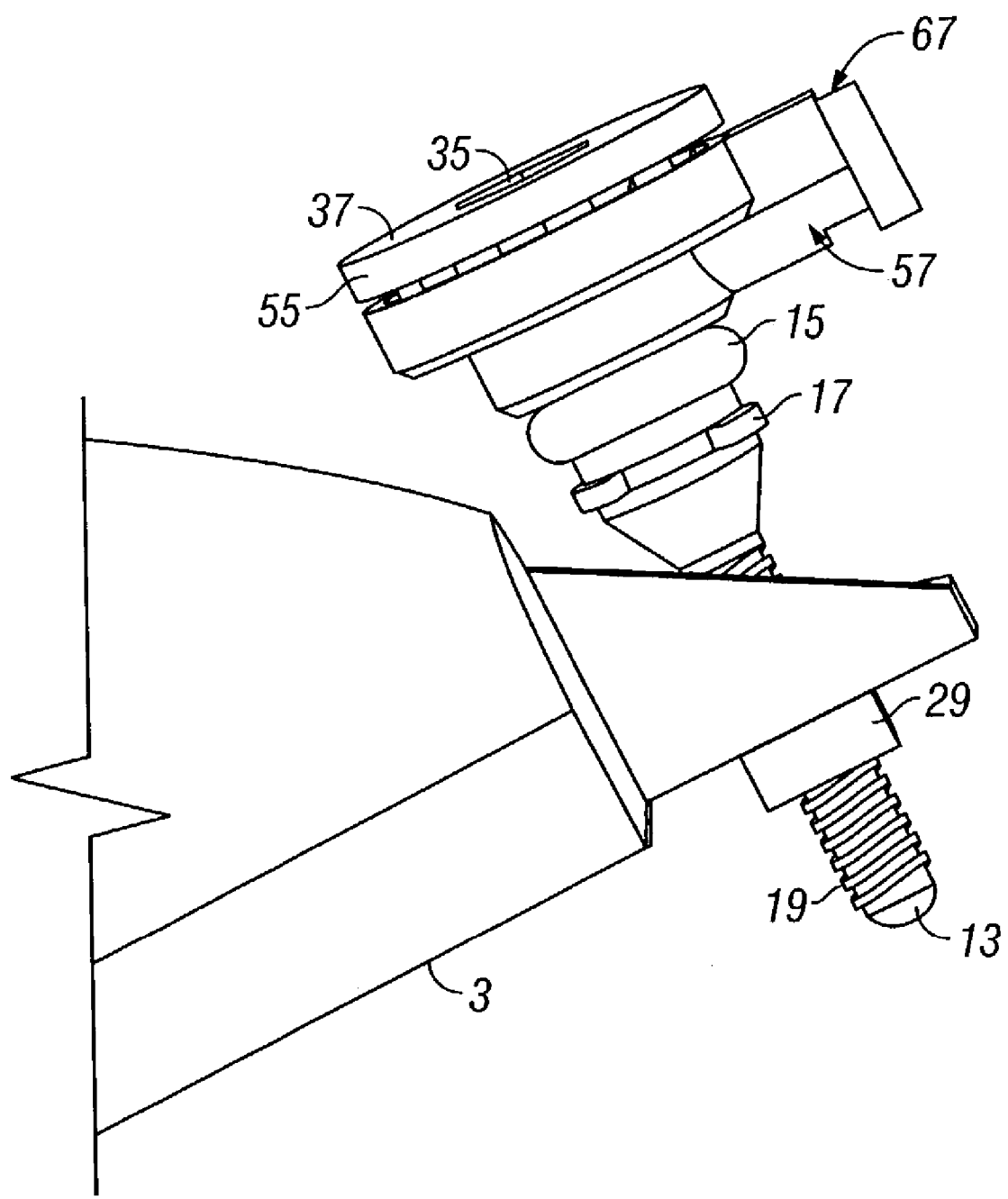
FIG. 7 is a side view of a headlamp assembly with a gear screw adjuster assembly in accordance with an additional embodiment of the present invention, where the headlamp housing is not shown.
Figure 8:
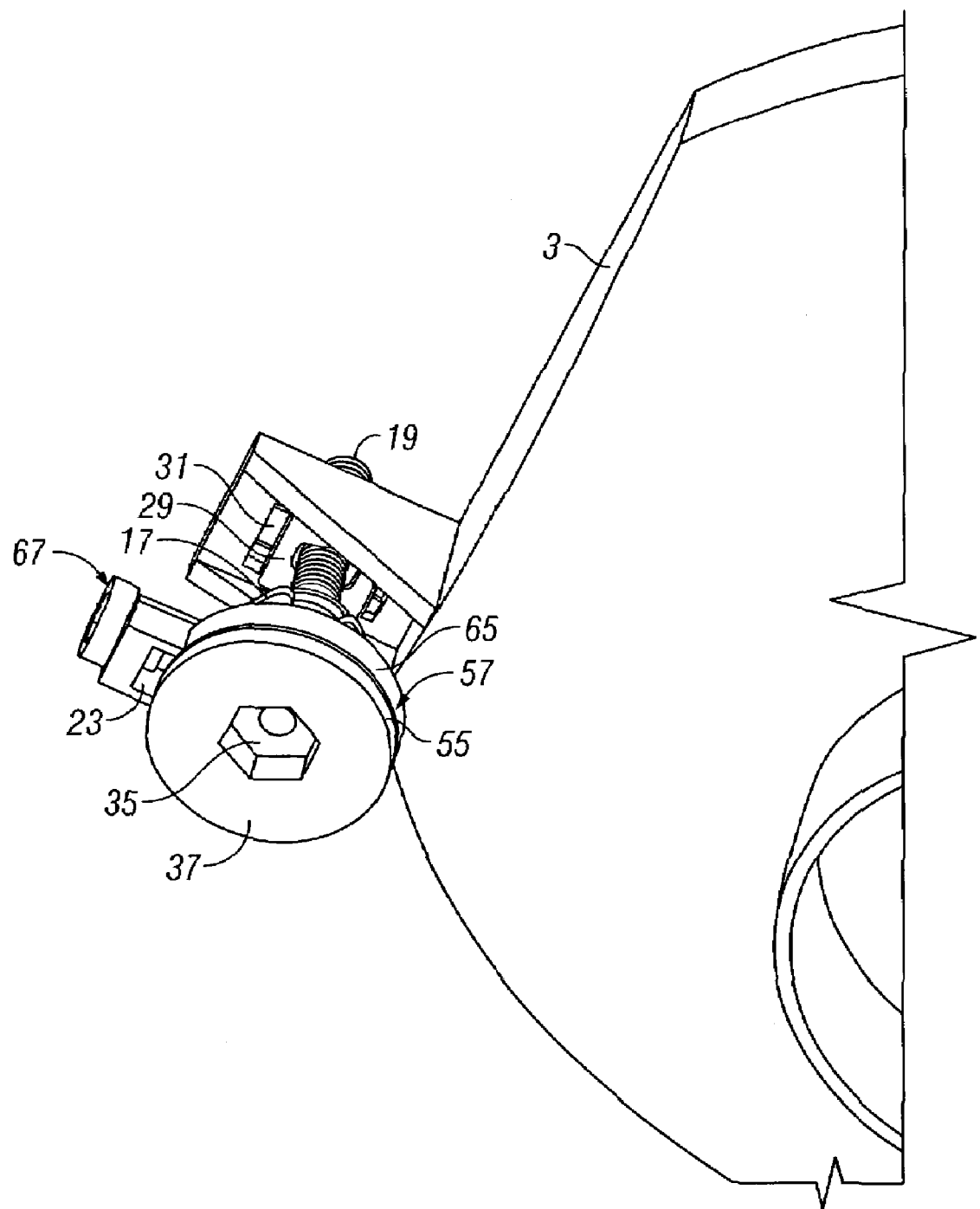
FIG. 8 is a rotated rear perspective view of the headlamp assembly with the gear screw adjuster assembly of FIG. 7, where the headlamp housing is not shown.

The slot 31 on the reflector 3 is constructed to complement the threading 27. This construction may be accomplished by using a plurality of fins 33 positioned in a staggered fashion so that rotation of the screw shaft 19 engages the fins 33 in such a manner so that the reflector 3 may be translated into the proper position. The slot 31 is constructed to allow the reflector 3 to move as the screw shaft 19 is rotated. Alternatively, as shown in FIGS. 7 and 8, the engagement of the screw shaft 19 with the reflector 3 can be accomplished indirectly by having the screw shaft 19 first engage a complementary threaded grommet 29. In such alternative, the threads 27 engage a grommet 29 and the grommet 29 is then inserted into the slot 31 or other receiving orifice of the reflector 3.

Once the screw shaft 19 is snap fit through the reinforced neck 21 and engages the reflector 3, the gear screw 13 is rotated thereby translating the reflector 3 so that the reflector is correctly positioned. Such rotation is accomplished by any number of conventional drive tools such as hexagonal, TORX® drive, or the like. This drive tool is inserted into a recess 35 in the head 37 of the gear screw 13. The head 37 also has a flange 55. The shoulder 39 of the gear screw 13 fits within the neck 21.

Figure 6:
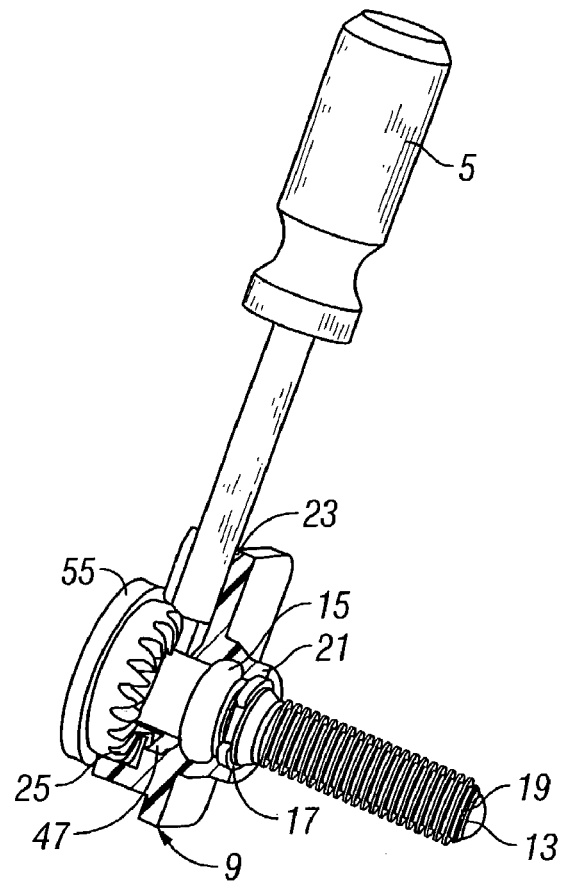
FIG. 6 is a rotated partial cross section of the headlamp assembly with the gear screw adjuster assembly of FIG. 1.

Additional adjustment of the aim 7 of the headlight is often required after the headlamp has been initially adjusted as described above. Such adjustment is necessary after accidents involving front-end damage, major engine repair, or as a result of routine gyrations and wear and tear. The person doing such adjustment often can not access the head 37 of the gear screw 13 to rotate the gear screw 13 as described. The person performing the additional adjustment can do so by inserting a driver 5 into the access shaft 23 wherein the driver 5 engages a gear teeth portion 25 of the gear screw 13. In the embodiments shown in FIGS. 1 and 4–6, the gear teeth 25 protrude in the forward direction. It is to be understood, however, that the gear teeth 25 may also protrude in the rearward direction. The driver 5 may be a flathead, Phillips head, TORX® head, hexagonal head driver, or the like, depending on the configuration used for the gear teeth. FIGS. 1 and 6 show use of a driver 5 to adjust the aim 7 of the headlamp.

Alternatively, a permanent driver input shaft (not shown) may be inserted in the access shaft 23. The head of the shaft may be configured to complement a driver. The gear engagement end (not shown) is configured to complement the gear teeth 25. Actuation of the driver 5 while the driver 5 is engaged, either directly or indirectly via the permanent driver input shaft, with the gear 25 results in rotation of the gear screw 13 and movement of the reflector 3 into the correct position. Such rotation allows the person actuating the driver 5 to properly position the aim 7 of the headlamp.

Figure 9:
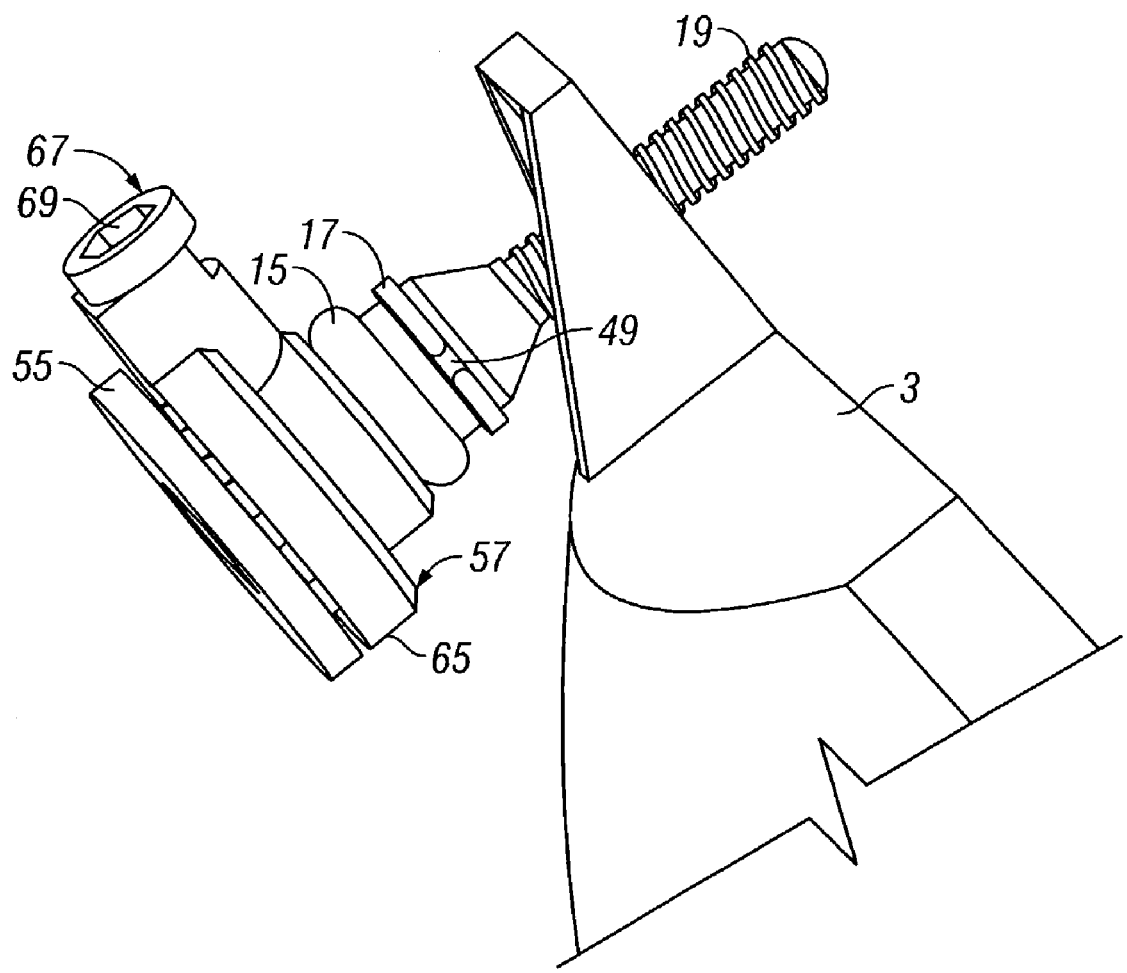
FIG. 9 is a perspective view of the headlamp assembly with the gear screw adjuster assembly of FIG. 7, where the headlamp housing is not shown.
Figure 10:
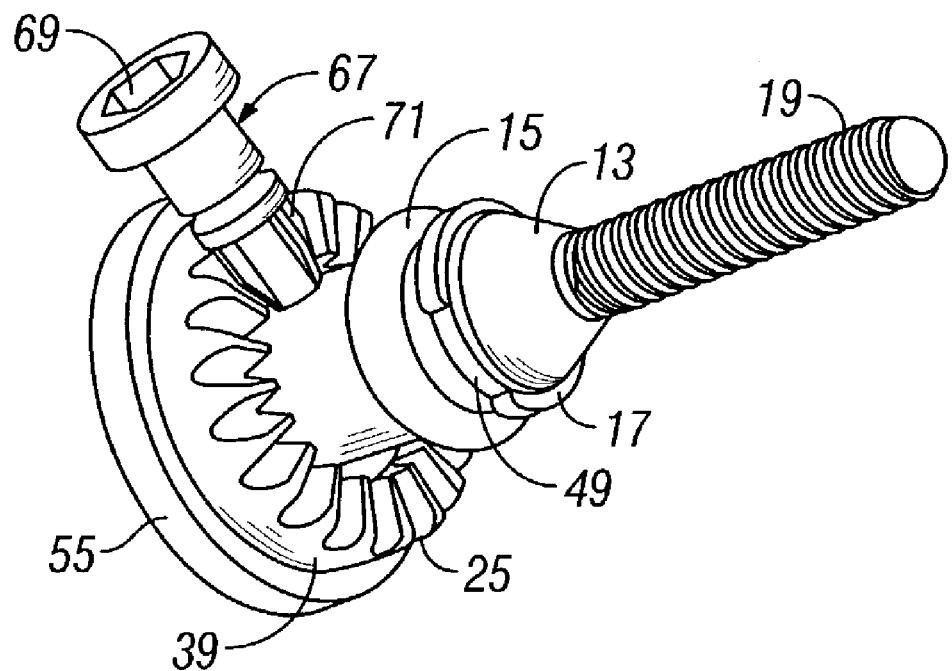
FIG. 10 is a perspective view of one embodiment of a gear screw engaged with a driver input shaft.
Figure 11:
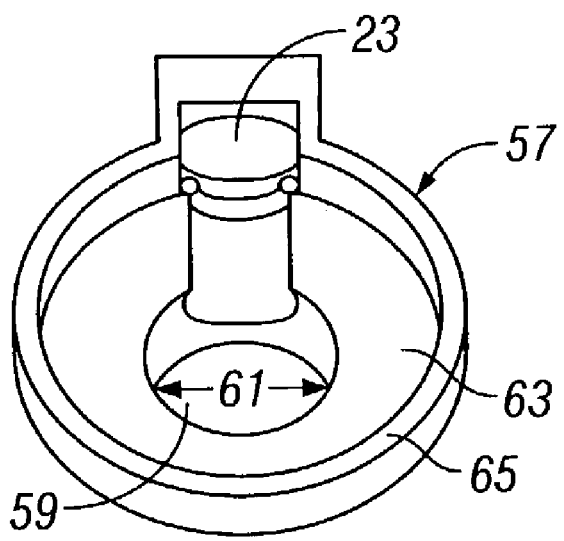
FIG. 11 is a perspective view of one embodiment of an adjuster housing for use in one embodiment of the gear screw adjuster assembly.

In one alternative embodiment of the invention, as shown in FIGS. 7–11, the gear screw 13 interacts with an adjuster housing 57, as well as the headlamp housing 9 and the reflector 3. The gear screw 13 has the same configuration as in the previously described embodiment and interacts with the headlamp housing 9 and the reflector 3 in the same fashion. FIG. 10 shows the configuration of the gear screw 13. FIGS. 7–9 show the interaction of the gear screw 13 with the reflector 3. In this embodiment, the gear screw 13 is first inserted through the adjuster housing 57. FIG. 11 shows the adjuster housing. The adjuster housing 57 has an opening 59 of a diameter 61 greater than that of the screw shaft 19 of the gear screw 13 and that of the neck 45 of the gear screw 13. The diameter 61 is less than that of the gear portion 25 of the gear screw 13 and is less than the shoulder 39 of the gear screw 13. In addition, the adjuster housing 57 has a recessed inner ledge 63. This construction allows the screw shaft 19 and the neck 45 to pass through the adjuster housing 57. The recessed inner ledge 63 comes into contact with and engages the shoulder 39 of the gear screw 13. The flange 55 of the gear screw 13 comes into contact with and engages the rear lip 65 of the adjuster housing 57. The gear screw 13 can be fully rotated inside the adjuster housing 57 after it has been inserted therein.

In this embodiment, the adjuster housing 57, and not the headlamp housing 9, provides for the access shaft 23 for post assembly headlamp adjustment. The adjuster housing 57 has an access shaft 23 as shown in FIGS. 7–11. In this embodiment, the driver 5 itself may be inserted into the access shaft 23 and thereby directly engage the gear portion 25. The gear portion 25 is notched to complement a driver so as to be actuated by operating the driver 5.

Alternatively, as shown in FIGS. 7–9, a driver input shaft 67 may be placed in the access shaft 23. The head 69 of the input shaft 67 is shaped to correspond with a driver 5. The gear engagement end 71 of the input shaft 67 is shaped so as to functionally engage the gear 25. This engagement is shown in FIG. 10. As such, actuation of the driver rotates the input shaft 67 which in turn rotates the gear screw 13. As above, rotation of the gear screw 13 translates the reflector 3 so that the aim 7 of the headlamp can be correctly positioned.

The mating geometry of the housing 9 is designed to accommodate the gear screw 13 and accompanying adjuster housing 57 so that the gear screw 13 can be first inserted into the adjuster housing 57 and then snap fit into the headlamp housing 9. The headlamp housing 9 also includes a nest (not shown) to orient and prevent rotation of the adjuster housing 57 and the access shaft 23 so that the access shaft 23 can be easily reached after the headlamp assembly 11 is installed in a vehicle.

In another embodiment of the present invention, shown in FIGS. 12–17, the gear screw 13, as in both previous embodiments, has a threaded 27 screw shaft 19, a neck 45, a shoulder 39, a gear portion 25, and a screw head 37 with a recess 35. An O-ring 15 is located in an O-ring groove along the neck 45. As shown in FIG. 14, the neck 45 has an undercut section 73 on the screw shaft 19. The diameter 75 of the gear screw 13 increases in the area 77 between the threads 27 and the undercut section 73. The undercut section 73 has a diameter less than that of the neck 45 and less than that of the area 77.

Figure 16:
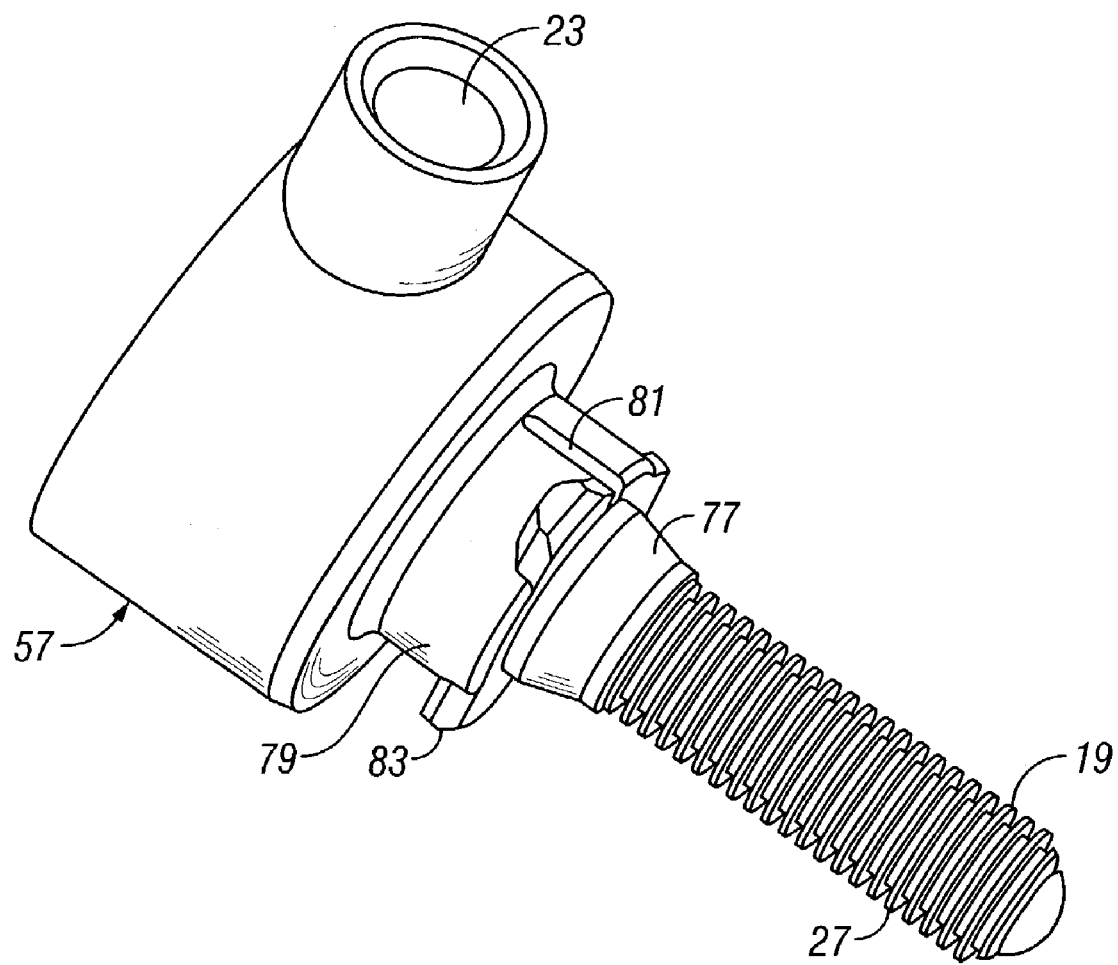
FIG. 16 is a perspective view of one embodiment of a gear screw adjuster assembly for use in the headlamp assembly of FIG. 12, where the gasket, headlamp housing, and reflector are not shown; and, FIG. 17 is a side partial cross-sectional view of the headlamp assembly with the gear screw adjuster of FIG. 12.
Figure 17:
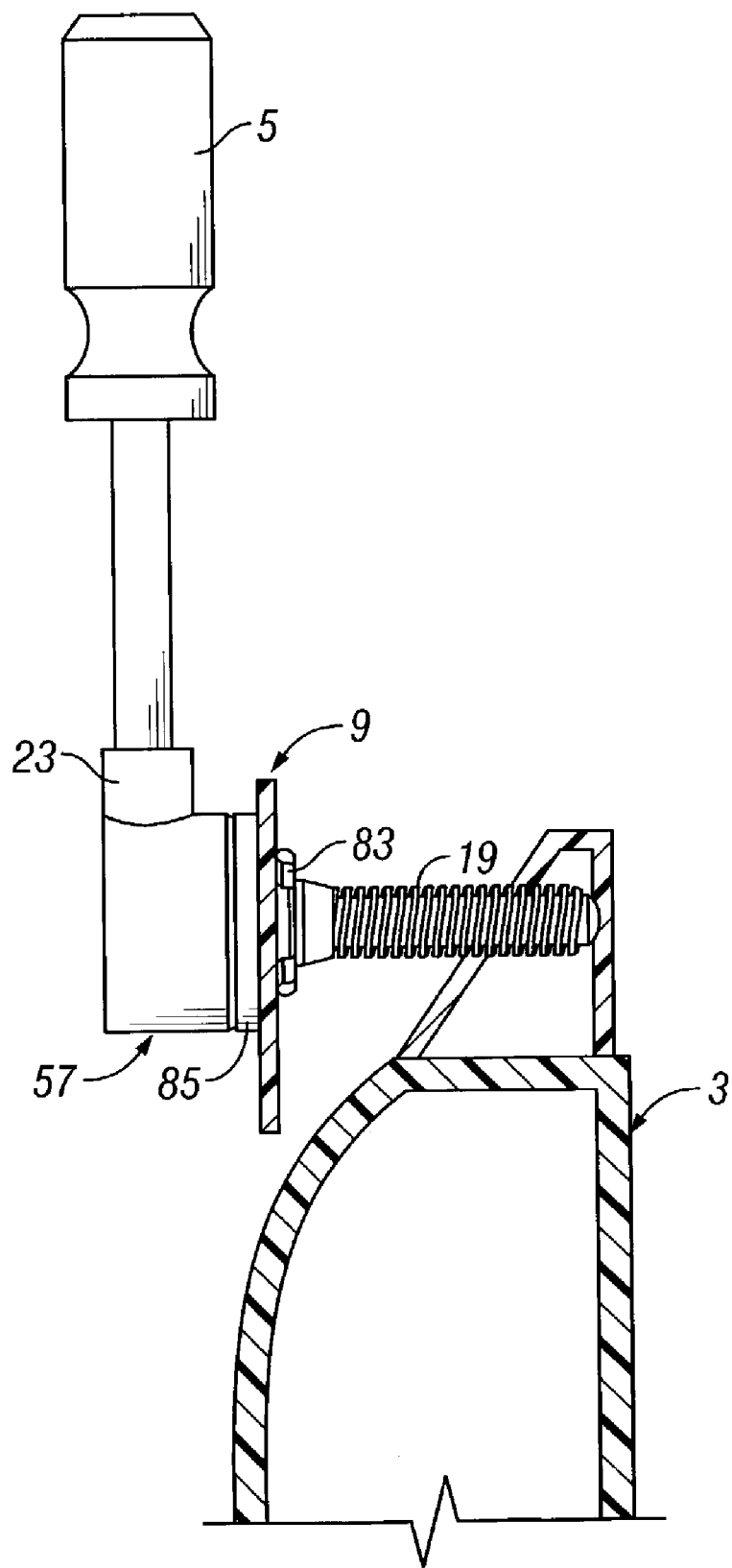

The gear screw 13 and accompanying O-ring 15 are snap-fitted into an adjuster housing 57 as shown in FIG. 16. The adjuster housing 57 has a recessed inner ledge (not shown in FIG. 16) against which the shoulder 39 will abut once the gear screw 13 is properly fit into the housing 57. The housing has a slightly expandable neck portion 79 that is slotted 81 for snap fitting. As the screw shaft 19 passes through the opening 59 of the adjuster housing 57, the increasing diameter 75 of the screw 13 comes into contact with the interior of the frontal portion 79. The opening 59 dilates to accommodate the increasing diameter 75 in contact with the neck portion 79. This dilation is accomplished by the diameter 75 forcibly expanding the slots 81. Once the undercut section 73 passes through the neck portion 79, the size of the opening 59 decreases as a result of the smaller diameter of the undercut section 73 contacting the interior of the neck portion 79. As such, the gear screw 13 is pushed through the adjuster housing 57 with the opening 59 of the neck portion 79 expanding to accommodate the increasing diameter 75 of the screw until the diameter of the gear screw 13 decreases in the undercut section 73 thereby allowing the neck portion 79 to snap close around the undercut section 73.

Alternatively, a retaining clip 17, as previously described may be used to snap the gear screw 13 into the adjuster housing 57. Here, inserting the gear screw 13 into the adjuster housing 57 causes the retaining clip 17 to be compressed into a corresponding groove 49 in the neck 45 of the gear screw 13. The interior of the adjuster housing 57 is contoured so that the retaining clip 17 snaps open and securely engages the adjuster housing 57 once the gear screw 13 is fully inserted in the adjuster housing 57 in the proper position.

Figure 15:
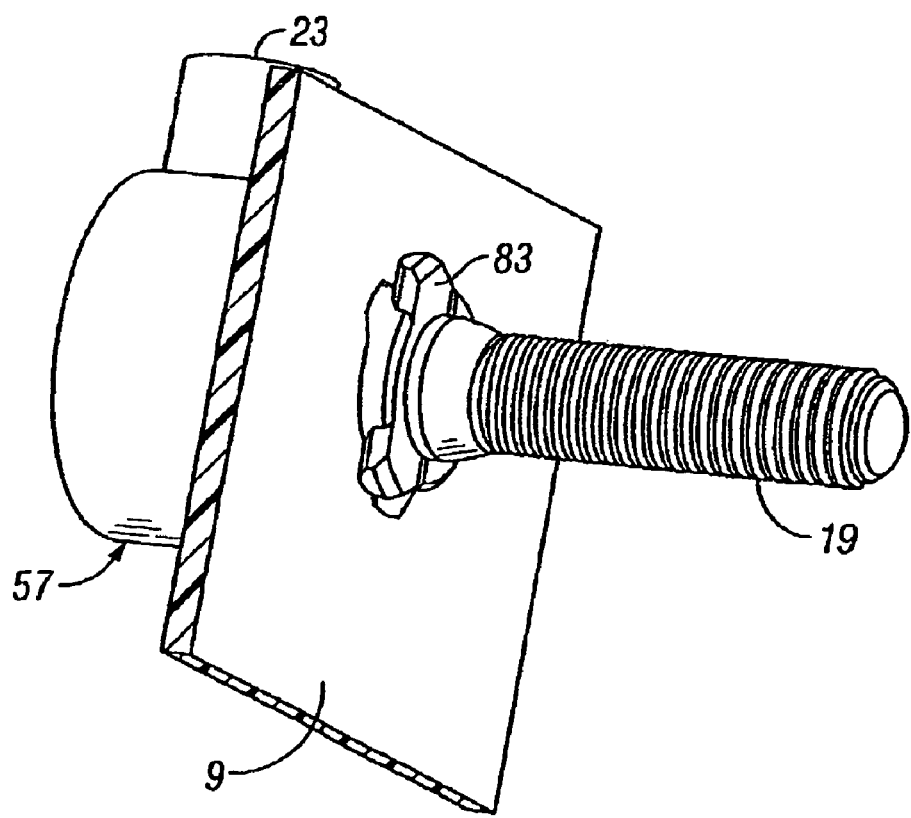
FIG. 15 is a perspective view of the headlamp assembly with the gear screw adjuster assembly of FIG. 12, where the reflector is not shown.
Figure 15A:
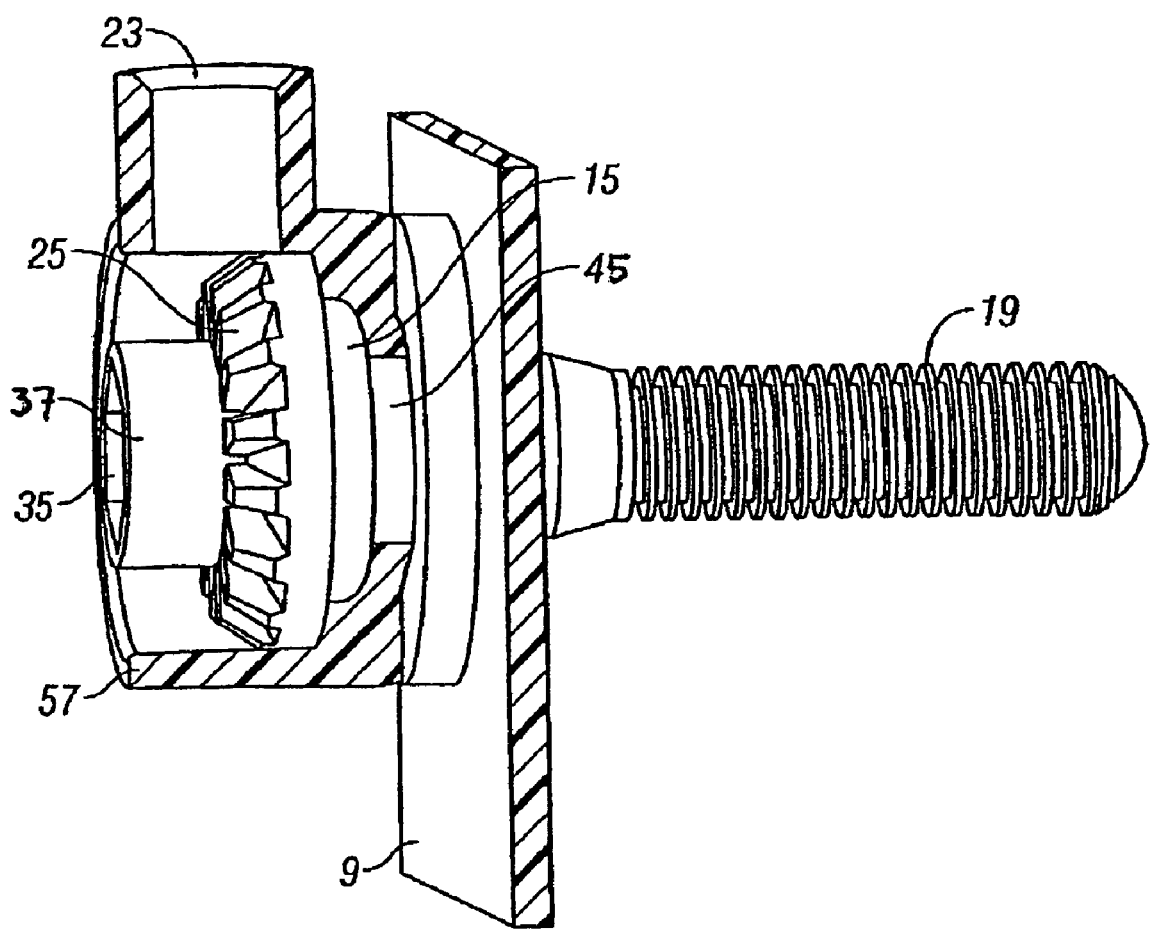
FIG. 15A is a side partial cross-sectional view of the headlamp assembly shown in FIG. 15.

The adjuster housing 57 can engage the headlamp housing 9 in the known quarter turn fashion or using other method known in the art. The quarter turn engagement is shown in FIG. 15. The neck portion 79 of the adjuster housing 57 has a plurality of quarter turn lugs 83 on its exterior. These lugs 83 geometrically mate with orifices in the headlamp housing 9. After the gear screw 13 is snap-fit into the adjuster housing 57, the adjuster housing 57 is positioned so that the lugs 83 enter matching orifices in the headlamp housing 9. Upon the lugs 83 fully entering the corresponding orifices, the headlamp housing 9 abuts the gasket 85 on the neck portion 79 and the flat front 87 of the adjuster housing. Once the lugs 83 have entered the corresponding orifices, the adjuster housing 57 is turned approximately up to one quarter or 90°. As shown in FIG. 15A, the O-ring 15 is radially compressed between the neck portion 79 and the O-ring groove on the neck 45 of the gear screw 13. The result is an effective radial seal between the interior diameter 47 of the adjuster housing 57 and the O-ring 15 and between the O-ring and the neck 45 of the screw 13.

Figure 12:
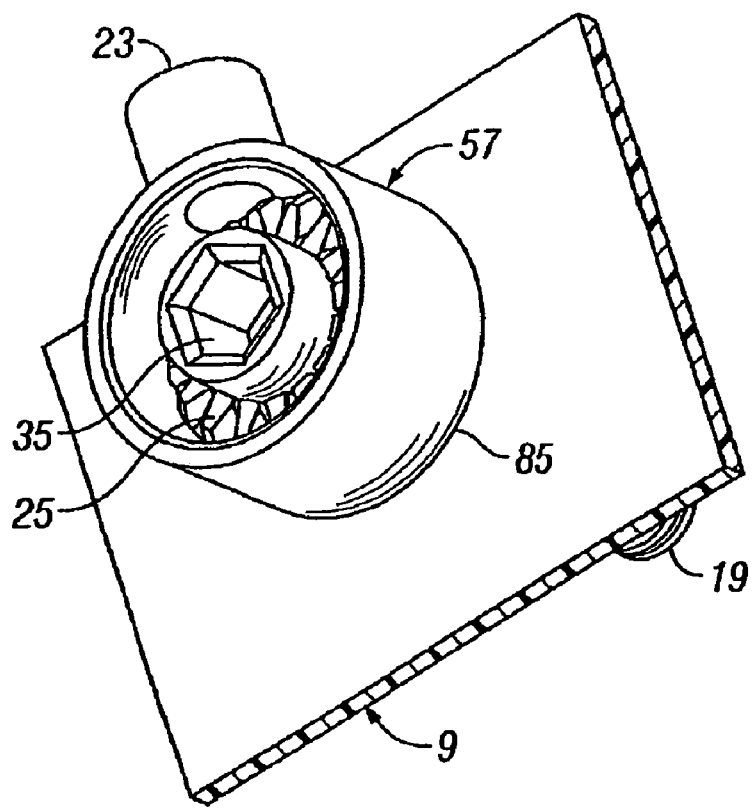
FIG. 12 is a rotated rear perspective view of the headlamp assembly with a gear screw in accordance with another embodiment of the invention, where the reflector is not shown.
Figure 13:
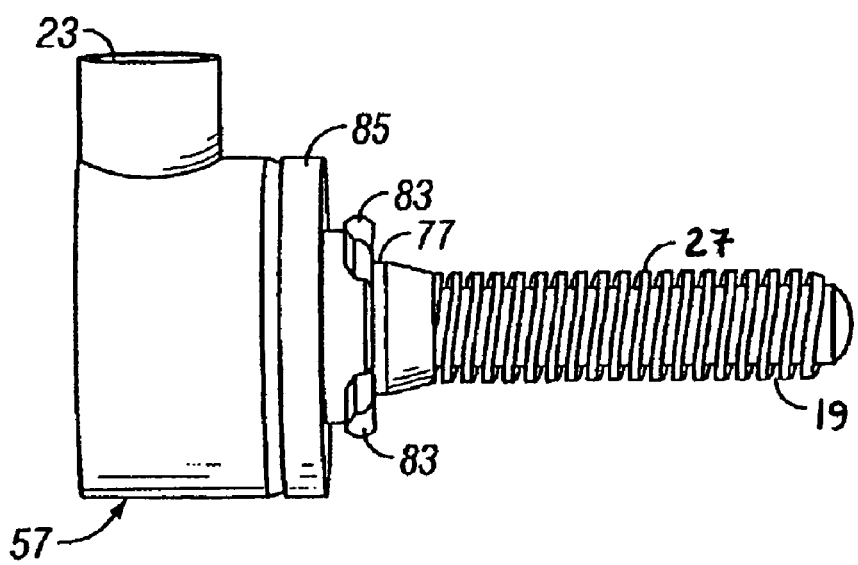
FIG. 13 is a side view of one embodiment of a gear screw adjuster assembly, where the headlamp housing and the reflector are not shown.

Once the neck portion 79 of the adjuster housing 57 has mated with the headlamp housing 9 as shown in FIG. 15, the reflector is positioned in the same manner as previously described. This positioning involves using a driver 5 to functionally engage the recess 35 in the screw head 37. FIG. 12 shows the gear screw 13 snap fit into the adjuster housing 57 and the housing 57 quarter turn inserted into the headlamp housing 9 so that a driver 5 may engage the recess 35. Actuation of the driver rotates the gear screw 13 thereby translating the reflector 3 into the correct position.

The gear screw adjuster assembly of the present invention may have other applications aside from use in a lamp assembly. Although the invention has been herein shown and described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims.

I claim:

1. A headlamp assembly comprising:
   a lens;
   a headlamp housing on which the lens is positioned;
   a reflector positioned within the headlamp housing behind the lens on at least one pivotable connector;
   a gear screw snap-fitted into position in the headlamp housing, the gear screw having an integrally formed head, an integrally formed shoulder with a plurality of gear teeth, and an integrally formed threaded shaft, the threaded shaft operably engaged to the reflector such that rotation of the gear screw pivots the reflector;
   a retaining clip positioned at least partially around the gear screw, the retaining clip capable of compression as the gear screw is snap-fitted into the headlamp housing and expansion so as to retain the gear screw in position in the headlamp housing; and
   an elastic ring positioned around the gear screw such that it provides a seal with respect to the gear screw.

2. The headlamp assembly of claim 1 wherein the plurality of gear teeth are configured to complement and be functionally engaged by a driver and wherein actuation of the driver rotates the gear screw causing the threaded shaft of the gear screw that is operably engaged to the reflector to cause adjustment of the reflector.

3. The headlamp assembly of claim 1 wherein the plurality of gear teeth are configured to complement and be functionally engaged by a gear engagement end of a driver input shaft, the driver input shaft having a head configured to be engaged by a driver and wherein actuation of the driver rotates the gear screw causing the threaded shaft operably engaged to the reflector to cause adjustment of the reflector.

4. The headlamp assembly of claim 1 wherein the elastic ring is positioned on a neck of the gear screw.

5. The headlamp assembly of claim 4 wherein the elastic ring positioned around the neck of the gear screw is in radial compression between the gear screw and the housing.

6. The headlamp assembly of claim 1 wherein the gear screw is threaded into a slot on the reflector.

7. The headlamp assembly of claim 6 wherein the slot has at least one fin on which the threaded shaft is threaded so as to allow the threaded shaft to move along the slot while the gear screw is rotated and the reflector is repositioned.

8. A headlamp assembly comprising:
   a lens;
   a headlamp housing on which the lens is positioned;

a reflector positioned within the headlamp housing behind the lens on at least one pivotable connector;

a gear screw positioned in the headlamp housing and operably engaged to the reflector such that rotation of the gear screw pivots the reflector;

an adjuster housing through which the gear screw is inserted to form a gear screw-adjuster combination, the gear screw-adjuster combination positioned on the headlamp housing such that the gear screw operably engages the reflector, wherein the gear screw snap fits into the adjuster housing; and an elastic ring positioned around the gear screw such that it provides a seal with respect to the gear screw.

9. The headlamp assembly of claim 8 wherein inserting the gear screw into the adjuster housing creates a radial seal of the elastic ring around the gear screw.

10. The headlamp assembly of claim 8 wherein the gear screw-adjuster combination engaging the headlamp housing creates a radial seal of the elastic ring around the gear screw.

11. The headlamp assembly of claim 8 wherein the gear screw-adjuster combination snap fits into the headlamp housing.

12. The headlamp assembly of claim 8 wherein the gear screw-adjuster combination engages the headlamp housing in a quarter turn fashion.

13. A headlamp assembly comprising:

a lens;

a headlamp housing on which the lens is positioned;

a reflector positioned within the headlamp housing behind the lens on at least one pivotable connector;

a gear screw positioned in the headlamp housing and operably engaged to the reflector such that rotation of the gear screw pivots the reflector;

an elastic ring positioned around the gear screw such that it provides a seal with respect to the gear screw;

wherein the gear screw has a head, a shoulder with a plurality of gear teeth, and a threaded shaft, the threaded shaft operably engaged to the reflector; and wherein the threaded end of the gear screw is threaded into a grommet, the grommet being positioned in a slot in the reflector so as to allow the grommet to move along the slot while the gear screw is rotated and the reflector is repositioned.

14. An adjuster for use in a headlamp housing, the headlamp housing having a reflector positioned therein, the adjuster comprising;

a gear screw having an integrally formed head, an integrally formed shoulder with a plurality of gear teeth, an integrally formed neck, and an integrally formed threaded shaft, the gear screw dimensioned for snap-fitting into an opening in the headlamp housing and such that the threaded shaft is operably connected to the reflector such that rotation of the gear screw causes movement of the reflector;

a retaining clip positioned at least partially around the gear screw, the retaining clip capable of compression as the gear screw is snap-fitted into the headlamp housing and expansion so as to retain the gear screw in position in the headlamp housing; and an elastic ring positioned on the neck of the gear screw such that snap fitting the gear screw into the opening creates a radial seal around between the gear screw, elastic ring, and opening.

15. The adjuster of claim 14 wherein the threaded shaft is threaded into the reflector.

16. The adjuster of claim 14 further comprising an adjuster housing through which the gear screw is inserted to form a gear screw-adjuster housing combination, the gear screw-adjuster combination positionable on the headlamp housing such that the gear screw operably engages the reflector.

17. An adjuster for use in a headlamp housing, the headlamp housing having a reflector positioned therein, the adjuster comprising:

a gear screw having a head, a shoulder with a plurality of gear teeth, a neck, and a threaded shaft, the gear screw dimensioned for snap-fitting into an opening in the headlamp housing and such that the threaded shaft is operably connected to the reflector such that rotation of the gear screw causes movement of the reflector;

an elastic ring positioned on the neck of the gear screw such that snap fitting the gear screw into the opening creates a radial seal around between the gear screw, elastic ring, and opening; and a grommet, the grommet threaded onto the threaded shaft such that when the gear screw is snap fit into the headlamp housing, the grommet is positioned onto the reflector.

* * * * *